United States Patent Office 3,810,946
Patented May 14, 1974

3,810,946
PURIFICATION OF PHENOL
Chuen Y. Yeh, Succasunna, and Harry E. Ulmer, Morristown, N.J., assignors to Allied Chemical Corporation, New York, N.Y.
No Drawing. Filed Nov. 3, 1972, Ser. No. 303,558
Int. Cl. C07c 37/38
U.S. Cl. 260—621 A                12 Claims

ABSTRACT OF THE DISCLOSURE

Phenol produced by decomposition of cumene hydroperoxide is purified by heating it with hydrobromic or hydroiodic acid, or their water-soluble salts, followed by distillation. This treatment not only reduces carbonyl-bearing impurities, but also reduces methylbenzofuran impurities.

BACKGROUND OF THE INVENTION

Production of phenol by oxidation of cumene and decomposition of the resulting hydroperoxide in the presence of acidic catalysts is well known. The decomposition product contains phenol and acetone as the principal products along with minor amounts of various side products. Fractional distillation of the decomposition product yields phenol of purity sufficient for many uses. Such phenol product, however, is unsatisfactory for certain purposes because it discolors on aging in that it becomes yellow or pink, and it discolors on chlorination or sulfonation.

Discoloration on sulfonation, and especially on chlorination, results from the presence of certain carbonyl-bearing impurities, especially ketonic impurities, as well as of methylbenzofurans, which are not separated by ordinary fractional distillation. These impurities are generally present in amounts exceeding 400 p.p.m. Ketonic impurities principally include mesityl oxide, acetol and acetophenone. Methylbenzofurans (both 2-methylbenzofuran and 3-methylbenzofuran) are generally present in amounts exceeding 100 p.p.m.

DISCUSSION OF THE PRIOR ART

It is known to purify phenol obtained from the decomposition product of cumene hydroperoxide by treating it with an acid selected from the group consisting of inorganic and strong organic acids at elevated temperature, neutralizing the acidified phenol and distilling it.

It is also known to purify phenol obtained by decomposition of cumene hydroperoxide by treating it with bases, including amines, followed by neutralization and distillation.

Unfortunately, however, known purification methods for phenol obtained by decomposition of cumene hydroperoxide are often incapable of eliminating or substantially reducing methylbenzofuran impurities.

SUMMARY OF THE INVENTION

In accordance with the present invention, pure phenol, substantially free from methylbenzofurans, is obtained from the decomposition product of cumene hydroperoxide comprising phenol and acetone from which products boiling lower than phenol have been removed by distillation by contacting it at a temperature of about 40° to 220° C. with 0.01 to 2.0 percent by weight of a treating agent selected from the group consisting of hydrobromic acid, hydroiodic acid, their water-soluble salts and mixtures thereof and distilling it.

DETAILED DESCRIPTION OF THE INVENTION

The phenol product which can advantageously be purified in accordance with the method of the present invention has been obtained by decomposition of cumene hydroperoxide to form phenol and acetone as principal products, followed by distillation to remove the products boiling lower than phenol, e.g., acetone. Preferably, the phenol product has also been subjected to further distillation to separate it from by-products having a boiling point higher than that of phenol.

The treating agents of the present invention interact with or bind carbonyl bearing impurities as well as methylbenzofurans in such manner that following treatment phenol free of these impurities can be recovered by distillation. The amount of treating agent required is, to some extent, dependent upon the concentration of the impurities present in the phenol. In general, the amount of treating agent used is about 0.01 to 2 percent, preferably about 0.03 to 1.0 percent of anhydrous treating agent, based on the weight of the phenol. It is to be understood, however, that the treating agent may be used in anhydrous form as well as in aqueous solutions of any desired concentration, but ordinarily in concentration of about 40 percent by weight of its aqueous solution.

The exact temperature at which the phenol is treated with the treating agent in accordance with the present invention is not critical. Generally, treatment is carried out at temperatures from 40° to 220° C., preferably 60° to 200° C. and more preferably yet at 100° to 120° C. The time of treatment should be sufficiently long to permit the desired reaction to take place. In general, reaction can be obtained in one minute, with a minimum of time of about five minutes being preferred. For optimum results, treating times of from 0.5 to 6 hours may be employed.

Ordinarily, it will be desirable to neutralize the treated phenol if hydrobromic or hydroiodic acid have been employed as treating agent, as is preferred practice, so as to avoid loss of phenol which may occur through side reactions in subsequent distillation and to avoid or reduce corrosion of equipment. Neutralization may conveniently be effected by adding liquid or finely pulverized alkaline acting agents, such as alkali metal or alkaline earth metal, oxides, hydroxides, carbonates or bicarbonates, or their solutions. Ammonia, aqueous or anhydrous, as well as its alkaline-acting derivatives, such as amines, mono- as well as polyamines, are also suitable as neutralizing agents. Alkali metal hydroxides and carbonates are preferred neutralizing agents. It will usually be preferred to employ the neutralizing agent in about the stoichiometric proportions required to neutralize the acidic treating agent.

The distillation following treatment with treating agent in accordance with the present invention can be carried out at atmospheric pressure, reduced pressure or superatmospheric pressure in the absence or presence of small amounts of water, say not more than about 5 percent by weight or, more preferably, not more than about 2 percent by weight of water, based on the phenol. Preferably, it is carried out at atmospheric pressure or reduced pressure at temperatures of 80° to 180° C., depending upon the pressure in the system.

DESCRIPTION OF THE PREFERRED EMBODIMENTS

The following examples are given to further illustrate the invention, to describe preferred embodiments and to set forth the best mode presently contemplated by us of carrying out the invention. It is to be understood, however, that the invention is not to be limited by the details described therein.

Generally, in preferred operation crude phenol obtained by decomposition of cumene hydroperoxide from which higher and lower boiling decomposition products have been removed by distillation, is first treated with small amounts, i.e. 0.05 to 0.5 percent by weight of hydrobromic or hydroiodic acid or mixtures thereof, for a period of from one to six hours at 100 to 120° C., the acid treating agent is neutralized by addition of alkali metal hydroxide or carbonate, and the phenol is distilled to obtain the purified phenol as overhead product containing less than 100 p.p.m. total impurities and substantially no methylbenzofurans.

In the following examples, methylbenzofuran impurities are determined by gas chromatography using conventional procedures.

EXAMPLE 1

The phenol starting material contains 151 p.p.m. 3-methylbenzofuran. 200 grams of the phenol and 0.40 gram of hydrobromic acid (0.20 percent by weight) are heated at 115° C. and 10 gram sample portions thereof are withdrawn after ½, 1, 2, 3, 4 and 6 hours. The samples so withdrawn are neutralized by addition of 0.02 gram of 50 percent aqueous sodium hydroxide. The neutralized samples are subjected to gas chromatographic determination of 3-methylbenzofuran. The results are set forth in Table I below.

COMPARATIVE EXPERIMENT 1

The procedure of Example 1 is repeated using identical phenol but containing 162 p.p.m. of 3-methylbenzofuran and substituting 0.40 gram (0.2 percent) by weight of sulfuric acid for the hydrobromic acid. The results are summarized in Table 1 below.

COMPARATIVE EXPERIMENT 2

Example 1 is repeated using identical phenol but containing 153 p.p.m. of 3-methylbenzofuran and substituting 0.40 gram (0.2 percent by weight) of hydrochloric acid for the hydrobromic acid. Results are summarized in Table I below.

TABLE I

| Treating time (hours) | Treating agent | | |
|---|---|---|---|
| | HBr, Ex. 1 | $H_2SO_4$, Comp. Exp. 1 | HCl, Comp. Exp. 2 |
| | 3-methylbenzofuran (p.p.m.) | | |
| 0 | 151 | 162 | 139 |
| ½ | 76 | 152 | 135 |
| 1 | 55 | 142 | 125 |
| 2 | 37 | 125 | 118 |
| 3 | 6 | 117 | 128 |
| 4 | 4 | 124 | 119 |
| 5 | | | |
| 6 | 4 | 156 | 143 |

The data in Table I clearly demonstrate that under the conditions of the present invention, hydrobromic acid effectively reduces 3-methylbenzofuran content of phenol, whereas sulfuric acid and hydrochloric acid do not substantially reduce 3-methylbenzofuran.

EXAMPLE 2

A quantity of the same phenol starting material as used in Example 1 containing 151 p.p.m. of 3-methylbenzofuran is treated with 0.2 percent by weight of hydrobromic acid at 115° C. for six hours, after which time 0.21 percent by weight of sodium hydroxide is added in form of a 50 percent aqueous solution. Final pH of the phenol is 7.0. The phenol so treated is then distilled under reduced pressure at a pot temperature of about 110° C. using a reflux rate of about 4:1. Cuts are taken and analyzed for 3-methylbenzofuran content. The results are summarized below:

| Cut number: | Percent by weight of distilland | 3-methyl-benzofuran (p.p.m.) |
|---|---|---|
| 1 | 7.3 | 5 |
| 2 | 6.4 | 19 |
| 3 | 11.0 | 18 |
| 4 | 60.4 | 22 |
| 5 | 3.7 | 16 |
| Total | 88.8 | |

COMPARATIVE EXPERIMENT 3

The procedure of Example 2 is repeated using the identical phenol starting material containing 162 p.p.m. of added 3-methylbenzofuran, but substituting sulfuric acid for the hydrobromic acid. Final pH of the treated neutralized phenol is 6.5. The mixture is distilled and cuts are taken and analyzed for 3 methylbenzofuran as in Example 2. Results are summarized below:

| Cut number: | Percent by weight of distilland | 3-methyl-benzofuran (p.p.m.) |
|---|---|---|
| 1 | 7.1 | 520 |
| 2 | 5.1 | 220 |
| 3 | 13.1 | 225 |
| 4 | 59.7 | 79 |
| 5 | 5.5 | 42 |
| 6 | 1.7 | 20 |
| Total | 92.7 | |

COMPARATIVE EXPERIMENT 4

Example 2 is repeated using the identical phenol containing 139 p.p.m. of added 3-methylbenzofuran, but substituting 0.2 percent by weight of hydrochloric acid for the hydrobromic acid, and using 0.25 percent by weight of 50 percent sodium hydroxide for neutralization. Final pH of the treated, neutralized phenol is 6.9. The mixture is distilled as in Example 2 and cuts are collected for analysis. The results are summarized below:

| Cut number: | Percent by weight of distilland | 3-methyl-benzofuran (p.p.m.) |
|---|---|---|
| 1 | 5.2 | 439 |
| 2 | 5.6 | 500 |
| 3 | 10.6 | 324 |
| 4 | 60.6 | 90 |
| 5 | 5.7 | 43 |
| 6 | 5.8 | 46 |
| Total | 93.5 | |

The above data demonstrate the effectiveness of hydrobromic acid in reducing 3-methylbenzofuran contamination of phenol, as compared to the ineffectiveness of sulfuric acid and hydrochloric acid for that purpose.

EXAMPLE 3

Phenol starting material containing 438 p.p.m. of 2 methylbenzofuran is treated with 0.20 percent by weight of hydrobromic acid at 115° C., and sample portions thereof are withdrawn after ½, 1, 2, 3, 4 and 6 hours. The samples so withdrawn are neutralized by addition of sodium hydroxide. The neutralized samples are subjected to gas chromatographic determination of 2-methylbenzofuran. The results are set forth in Table II below.

COMPARATIVE EXPERIMENT 5

The procedure of Example 3 is repeated using identical phenol, but containing 374 p.p.m. of 2-methylbenzofuran and substituting 0.20 percent by weight of sulfuric acid for the hydrobromic acid. The results are summarized in Table II below.

COMPARATIVE EXPERIMENT 6

The procedure of Example 3 is repeated using identical phenol, but containing 232 p.p.m. of 2-methylbenzofuran and substituting 0.20 percent by weight of hydrochloric acid for the hydrobromic acid. The results are summarized in Table II below.

TABLE II

| Treating time (hours) | Treating agent | | |
|---|---|---|---|
| | HBr, Ex. 3 | H$_2$SO$_4$ Comp. Exp. 5 | HCl, Comp. Exp. 6 |
| | 2-methylbenzofuran (p.p.m.) | | |
| 0 | 438 | 374 | 232 |
| ½ | 374 | ¹ 695 | ² 443 |
| 1 | 257 | ¹ 790 | N.A. |
| 2 | 183 | ¹ 890 | ² 476 |
| 3 | 65 | ¹ 440 | ² 498 |
| 4 | 57 | ¹ 430 | ² 536 |
| 6 | 55 | 358 | ² 550 |

¹ New impurity formed, eluting at same retention time as 2-methylbenzofuran, which is converted to different higher boiling compound(s) after hours of heating.
² New impurity formed, eluting at same retention time as 2-methylbenzofuran.

EXAMPLE 4

Phenol starting material containing 438 p.p.m. of 2-methylbenzofuran is treated with 0.20 percent by weight of hydrobromic acid at 115° C. for six hours and is then neutralized by addition of 0.2 perecnt by weight of sodium hydroxide. The phenol so treated is then distilled under reduced pressure of 37 to 39 mm. Hg at pot temperature of about 110° C. Cuts are taken and analyzed for 2-methylbenzofuran content. The results are summarized below:

| Cut number: | Percent by weight of distilland | 2-methyl-benzofuran (p.p.m.) |
|---|---|---|
| 1 | 5.3 | 140 |
| 2 | 5.5 | 78 |
| 3 | 9.0 | 62 |
| 4 | 61.8 | 29 |
| 5 | 4.6 | 15 |
| 6 | 3.2 | 14 |
| Total | 89.4 | |

COMPARATIVE EXPERIMENT 7

Example 4 is repeated using identical phenol containing 374 p.p.m. of added 2-methylbenzofuran, but substituting 0.20 percent by weight of sulfuric acid for the hydrobromic acid. Following neutralization the phenol so treated is distilled under reduced pressure of 32 to 36 mm. Hg at pot temperature of about 111° to 113° C. Cuts are taken and analyzed for 2-methylbenzofuran content. The results are summarized below:

| Cut number: | Percent by weight of distilland | 2-methyl-benzofuran (p.p.m.) |
|---|---|---|
| 1 | 3.6 | 1,500 |
| 2 | 4.6 | 970 |
| 3 | 9.2 | 980 |
| 4 | 64.2 | 130 |
| 5 | 5.7 | N.A. |
| 6 | 5.7 | 35 |
| Total | 93.0 | |

COMPARATIVE EXPERIMENT 8

Example 4 is repeated using the identical phenol containing 232 p.p.m. of added 2-methylbenzofuran, but substituting 0.20 percent by weight of hydrochloric acid for the hydrobromic acid. After treatment the mixture is distilled and cuts are collected for analysis. The results are summarized below:

| Cut number: | Percent by weight of distilland | 2-methyl-benzofuran (p.p.m.) |
|---|---|---|
| 1 | 4.1 | 19,000 |
| 2 | 3.9 | 9,800 |
| 3 | 10.3 | 8,270 |
| 4 | 64.7 | 1,880 |
| 5 | 3.8 | 76 |
| 6 | 4.5 | 112 |
| Total | 91.3 | |

The above shows that treatment of phenol containing 2-methylbenzofuran with sulfuric or hydrochloric acid does not effect reduction of 2-methylbenzofuran content, but indeed results in formation of other impurities eluting at the same place as 2-methylbenzofuran. Treatment of phenol contaminated with 2-methylbenzofuran with hydrobromic acid, as shown in Example 4, effectively reduces 2-methylbenzofuran contamination.

We have found that chlorination number of phenol is substantially affected by methylbenzofuran at both 490 and 540 mµ. The 2-methylbenzofuran has an equal affect at both wavelengths, whereas 3-methylbenzofuran affects the chlorination number principally only at 490 mµ. Chlorination number is determed by placing 10±0.1 grams of the phenol to be tested in a chlorination vessel fitted with a gas inlet tube extending to the bottom of the vessel. The bottom of the inlet tube is constructed of fritted glass to allow fine dispersion of chlorine as it enters the liquid phenol. The vessel is placed in an oil bath and the sample brought to 80° C. Chlorine gas is introduced into the phenol at a rate of 4 liters per hour at a temperature of 80±3° C. until a weight gain of 5.5 to 6 grams is obtained. The sample is weighed periodically to confirm 55 to 60 percent chlorination. It is then transferred to a one centimeter cell for analysis by a recording spectophotometer. The absorption maxima at 490 and 540 mµ are noted for test purposes. If the absorbance is too great for the one centimeter cell, a 0.1 cm. cell may be used, or ten-fold dilution of the sample with chloroform may be employed, and the recorded absorbance is multiplied by a factor of ten.

EXAMPLE 5

A sample of commercial phenol (277 g.) produced by cumene hydroperoxide decomposion, followed by distillation to remove decomposition product boiling lower than phenol, and further distillation to obtain the phenol as overhead product is treated with 0.2 weight percent of hydrobromic acid at 115° C. for three hours, followed by neutralization at 80° C. with 0.23 weight percent sodium hydroxide. The treated phenol is distilled at 115° C. pot temperature and fractions are collected and analyzed for impurities usually present in commercial grade cumene phenol. Results are shown in Table V. The results demonstrate removal of methylbenzofurans as well as of other impurities present in commercial grade cumene phenol.

at 115° C. pot temperature and fractions are collected and analyzed for the various impurities commonly found in commercial cumene phenol. Results are given in Table VI.

TABLE V

| | Wt. percent total charge | Comments | Chlorination number at— | | Impurities | | | | | | | | | |
|---|---|---|---|---|---|---|---|---|---|---|---|---|---|---|
| | | | 490 mµ | 540 mµ | Acetone | MO[2] | Cu[3] | Acetol | AMS[4] | MBF[5] | AP[6] | DMPC[7] | Unk[8] | Total |
| Cut number: | | | | | | | | | | | | | | |
| | 100 | Charge | 14.2 | 9.9 | 17 | 135 | 74 | 1,429 | 1,364 | 94 | 829 | 48 | 153 | 1,143 |
| 1 | 1.9 | | | | 7 | 0 | 2 | 0 | 0 | 0 | 0 | 0 | 34 | 43 |
| 2 | 4.0 | | | | 3 | 1 | 2 | 0 | 0 | 0 | 26 | 0 | 16 | 48 |
| 3 | 4.7 | Fore cut 18.2% | | | 3 | 1 | 0 | 0 | 0 | 8 | 23 | 0 | 23 | 58 |
| 4 | 1.2 | | | | 3 | 0 | 0 | 0 | 0 | 0 | 0 | 0 | 49 | 52 |
| 5 | 6.4 | | | | 5 | 0 | 0 | 0 | 0 | 0 | 0 | 0 | 30 | 35 |
| 6 | 26.3 | | | | 3 | 0 | 1 | 0 | 0 | 0 | 0 | 0 | 7 | 11 |
| 7 | 10.9 | | | | | | | | | | | | | |
| 8 | 6.9 | Heart cut 57.9% | 0.27 | (¹) | 5 | 0 | 2 | 0 | 0 | 0 | 0 | 0 | 0 | 7 |
| 9 | 6.3 | | | | 5 | 0 | 1 | 0 | 0 | 0 | 0 | 0 | 1 | 7 |
| 10 | 4.5 | | | | 2 | 0 | 1 | 0 | 0 | 0 | 0 | 0 | 2 | 5 |
| 11 | 3.0 | | | | 11 | 0 | 0 | 0 | 0 | 0 | 0 | 0 | 9 | 20 |
| 12 | 2.7 | | | | 4 | 0 | 0 | 0 | 0 | 0 | 0 | 0 | 0 | 4 |
| 13 | 3.7 | | | | 11 | 0 | 4 | 0 | 0 | 0 | 0 | 0 | 30 | 45 |
| 14 | 3.0 | Tail cut 14.2% | | | 4 | 0 | 0 | 0 | 0 | 0 | 0 | 0 | 1 | 5 |
| 15 | 3.8 | | | | 17 | 0 | 0 | 0 | 0 | 0 | 0 | 0 | 2 | 19 |
| 16 | 1.0 | | | | 5 | 0 | 0 | 0 | 0 | 0 | 0 | 0 | 8 | 13 |
| Residue | 3.7 | Not analyzed | | | | | | | | | | | | |
| Loss | 6.1 | Column hold-up and vapor losses. | | | | | | | | | | | | |

[1] Absorption at 540 is 0.1 but is not a peak—at best a shoulder of 490 peak.
[2] Mesityl oxide. [3] Cumene. [4] Alpha-methylstyrene. [5] Methyl benzofurans. [6] Acetophenone. [7] Dimethyl phenyl carbinol. [8] Unknown.

EXAMPLE 6

A sample of crude phenol obtained by decomposition of cumene hydroperoxide, followed by distillation to remove fractions boiling lower than phenol, but containing This example illustrates efficiency of hydrobromic acid in removing methyl benzofurans and other impurities from a very crude commercial grade cumene phenol which has not yet been distilled free of higher boiling impurities.

TABLE VI

| Sample | Weight percent | Chlorination number at— | | Impurities[1] (p.p.m.) | | | | | | | | | |
|---|---|---|---|---|---|---|---|---|---|---|---|---|---|
| | | 490 mµ | 540 mµ | Acetone | MO[2] | Cu[3] | Acetol | AMS[4] | MBF[5] | AP[6] | DMPC[7] | Unk[8] | Total |
| Starting material | 100 | 47.5 | 32.5 | 118 | 92 | 25 | 93 | 1,223 | 202 | 24.495 | 0 | 59 | 26,309 |
| Cut number: | | | | | | | | | | | | | | |
| 1 | 2.1 | | | 4 | 0 | 3 | 2 | 0 | 45 | 0 | 0 | 53 | 107 |
| 2 | 3.0 | | | 4 | 0 | 0 | 3 | 0 | 16 | 0 | 0 | 27 | 50 |
| 3 | 3.1 | 14.1 | | 4 | 0 | 0 | 3 | 1 | 14 | 0 | 0 | 38 | 60 |
| 4 | 3.2 | | | 2 | 0 | 0 | 8 | 3 | 16 | 0 | 0 | 27 | 56 |
| 5 | 2.7 | | | 2 | 1 | 0 | 5 | 2 | 32 | 0 | 0 | 16 | 58 |
| 6 | 6.2 | 58.9 | | 2 | 0 | 0 | 5 | 1 | 0 | 0 | 0 | 8 | 16 |
| 7 | 52.7 | | 0.27 | 4 | 0 | 1 | 2 | 0 | 0 | 0 | 0 | 6 | 13 |
| 8 | 4.6 | | | 3 | 0 | 2 | 0 | 0 | 0 | 0 | 0 | 29 | 34 |
| 9 | 0.7 | 6.4 | | | | | | | | | | | |
| 10 | 1.1 | | | 6 | 0 | 0 | 0 | 8 | 0 | 0 | 0 | 23 | 37 |
| 11 | | | | | | | | | | | | | |
| Residue | 13.4 | | | | | | | | | | | | |
| Loss | 7.2 | | | | | | | | | | | | |

[1] High boilers such as cumyl phenol, alpha-methyl styrene dimers, and the like were not analyzed and are not included in "total impurities."
[2] Mesityl oxide. [3] Cumene. [4] Alpha-methylstyrene. [5] Methyl benzofurnas. [6] Acetophenone. [7] Dimethyl phenyl carbinol. [8] Unknown.

all impurities boiling higher than phenol, is treated with 0.2 weight percent hydrobromic acid at 115° C. for three hours and is then neutralized at 80° C. with 0.23 weight percent sodium hydroxide. The treated mixture is distilled

EXAMPLE 7

A sample of commercial phenol containing 118 p.p.m. methyl benzofurans with 614 p.p.m. total impurities is heated with 0.01 weight percent of hydrobromic acid at 115° C. for four hours, followed by distillation. No methyl benzofurans were found in the mid-70 percent cut collected during distillation. Total impurities of starting phenol and purified phenol are shown below. This example illustrates efficiency of hydrobromic acid in removing impurities, including methyl benzofurans, when used in amount of 0.1 percent by weight.

| | Optical density at— | | Impurities (p.p.m.) | | | | | | | | | Total |
|---|---|---|---|---|---|---|---|---|---|---|---|---|
| | 490 mµ | 540 mµ | Acetone | MO[1] | Cu[2] | Acetol | AMS[3] | MBF[4] | AP[5] | DMPC[6] | Unk[7] | p.p.m. |
| Starting phenol | 11.50 | 5.50 | 6 | 259 | 9 | 212 | 3 | 118 | 0 | 0 | 7 | 614 |
| Purified phenol | 0.78 | 0.38 | 6 | 0 | 2 | 0 | 0 | 0 | 0 | 0 | 33 | 41 |

[1] Mesityl oxide.  [2] Cumene.  [3] Alpha methylstyrene.  [4] Methyl benzofurans.  [5] Acetophenone.  [6] Dimethyl phenyl carbinol.  [7] Unknown.

EXAMPLE 8

A portion of the same phenol as used in Example 7 is heated with 0.1 percent by weight hydroiodic acid at 990 C. for six hours, followed by neutralization with 0.03 percent sodium hydroxide distillation. A 70 percent heart cut is collected, a portion of which is analyzed for impurities, while another portion is chlorinated in accordance with above-described procedure. This example illustrates the efficacy of hydrobromic acid for removal of impurities, including methyl benzofurans, from phenol containing them for purification.

| | Optical density at— | | Impurities (p.p.m.) | | | | | | | | | Total |
|---|---|---|---|---|---|---|---|---|---|---|---|---|
| | 490 mµ | 540 mµ | Acetone | MO[1] | Cu[2] | Acetol | AMS[3] | MBF[4] | AP[5] | DMPC[6] | Unk[7] | p.p.m. |
| Starting phenol | 11.50 | 5.50 | 6 | 259 | 9 | 212 | 3 | 118 | 0 | 0 | 7 | 614 |
| Purified phenol | 1.14 | | 4 | 0 | 5 | 0 | 5 | 5 | 0 | 0 | 45 | 62 |

[1] Mesityl oxide.  [2] Cumene.  [3] Alpha-methylstyrene.  [4] Methyl benzofurans.  [5] Acetophenone.  [6] Dimethyl phenyl carbinol.  [7] Unknown.

EXAMPLE 9

A portion of the same phenol as used in Example 6 is heated with 0.20 percent by weight of sodium bromide at 115° C. for two hours, followed by distillation. A 70 percent heart cut is collected, a portion of which is analyzed for impurities, while another portion is chlorinated in accordance with above-described procedure. This example illustrates efficacy of sodium bromide for removal of methylbenzofuran impurities from phenol containing the same.

| | Optical density at— | | Impurities (p.p.m.) | | | | | | | | | Total |
|---|---|---|---|---|---|---|---|---|---|---|---|---|
| | 490 mµ | 740 mµ | Acetone | MO[1] | Cu[2] | Acetol | AMS[3] | MBF[4] | AP[5] | DMPC[6] | Unk[7] | p.p.m. |
| Starting phenol | 47.5 | 32.5 | 118 | 92 | 25 | 93 | 1,223 | 202 | 24.495 | 0 | 59 | 26,309 |
| Purified phenol | 5.90 | 3.05 | 3 | 95 | 1 | 6 | 10 | 24 | 0 | 0 | 51 | 190 |

[1] Mesityl oxide.  [2] Cumene.  [3] Alpha-methylstyrene.  [4] Methyl benzofurans.  [5] Acetophenone.  [6] Dimethyl phenyl carbinol.  [7] Unknown.

When in the above examples hydroiodic acid is substituted for the hydrobromic acid, similar results are obtained, that is to say, contamination of phenol obtained from decomposition of cumene hydroperoxide with 2-methylbenzofuran and 3-methylbenzofuran is effectively reduced. On the other hand, when phenol obtained by decomposition of cumene hydroperoxide containing methylbenzofurans is treated with other inorganic or strong organic acids, such as phosphoric acid, toluene sulfonic acid, benzosulfonic acid or chlorinated sulfonic acids, then a corresponding decrease in methylbenzofurans is not obtained.

It will be apparent that many modifications and variations can be affected without departing from the scope of the novel concepts of the present invention, and the illustrative details disclosed are not to be construed as imposing undue limitations on the invention.

We claim:

1. A process for the purification of phenol obtained from the decomposition product of cumene hydroperoxide, from which products boiling lower than phenol have been removed by distillation, which comprises contacting the phenol at a temperature of 40° to 220° C. with 0.01 to 2.0 percent by weight of a treating agent selected from the group consisting of hydrobromic acid and hydroiodic acid, and mixtures thereof, and distilling the phenol.

2. The process of claim 1 wherein the phenol is contacted with the treating agent at a temperature of 60° to 200° C. and wherein the treating agent is employed in amount of 0.03 to 1.0 percent by weight.

3. The process of claim 2 wherein the phenol is contacted with the treating agent for a period of 0.5 to 6 hours.

4. The process of claim 3 wherein the phenol, prior to contacting it with the treating agent, has been distilled to separate it from products boiling higher than phenol.

5. The process of claim 1 wherein the treating agent is hydrobromic acid.

6. The process of claim 5 wherein the phenol, prior to contacting it with the hydrobromic acid, has been distilled to separate it from products boiling higher than phenol.

7. The process of claim 6 wherein the phenol is contacted with the hydrobromic acid for a period of 0.5 to 6 hours at a temperature of 60° to 200° C., and wherein the phenol following contact with the hydrobromic acid but before distillation is neutralized by adding an alkaline acting agent.

8. The process of claim 6 wherein the phenol is contacted for a period of 0.5 to 6 hours at a temperature of 100° to 120° C. with 0.05 to 0.5 percent by weight of hydrobromic acid, followed by neutralization by adding a neutralizing agent selected from the group consisting of alkali metal hydroxides and carbonates.

9. The process of claim 1 wherein the treating agent is hydroiodic acid.

10. The process of claim 9 wherein the phenol is contacted with 0.03 to 1 percent by weight of hydroiodic acid at a temperature of 60° to 200° C.

11. The process of claim 10 wherein the phenol has been distilled prior to contacting it with hydroiodic acid to separate it from products boiling lower than phenol.

12. The process of claim 11 wherein the phenol is treated with the hydrobromic acid for 0.5 to 6 hours, followed by neutralization by adding neutralizing agent selected from the group consisting of alkali metal hydroxides and carbonates.

References Cited

UNITED STATES PATENTS

| | | | |
|---|---|---|---|
| 3,140,318 | 7/1964 | Sodoman et al. | 260—621 A |
| 3,029,292 | 4/1962 | Nixon | 260—621 A |
| 3,029,293 | 4/1962 | Nixon | 260—621 A |

LEON ZITVER, Primary Examiner

N. MORGENSTERN, Assistant Examiner

U.S. Cl. X.R.

260—623 R